US012760811B2

(12) United States Patent
Shi et al.

(10) Patent No.: US 12,760,811 B2
(45) Date of Patent: Oct. 13, 2026

(54) FAUCET AND FAUCET BODY THEREOF

(71) Applicant: KAIPING YIZHAN VALVE CORE CO., LTD., Kaiping (CN)

(72) Inventors: Xianbing Shi, Kaiping (CN); Junfa Shen, Kaiping (CN); Jieci Ou, Kaiping (CN); Zhigang Tan, Kaiping (CN)

(73) Assignee: KAIPING YIZHAN VALVE CORE CO., LTD., Kaiping (CN)

( * ) Notice: Subject to any disclaimer, the term of this patent is extended or adjusted under 35 U.S.C. 154(b) by 107 days.

(21) Appl. No.: 18/772,280

(22) Filed: Jul. 15, 2024

(65) Prior Publication Data

US 2025/0361946 A1 Nov. 27, 2025

(30) Foreign Application Priority Data

May 22, 2024 (CN) ......................... 202410644889.0

(51) Int. Cl.
*F16K 11/00* (2006.01)
*E03C 1/04* (2006.01)

(52) U.S. Cl.
CPC .......... *F16K 19/006* (2013.01); *E03C 1/0403* (2013.01)

(58) Field of Classification Search
CPC ........ F16K 19/006; F16K 11/207; E03C 1/04; E03C 1/0403; E03C 1/021; E03C 2001/028
See application file for complete search history.

(56) References Cited

U.S. PATENT DOCUMENTS 2,855,001 A * 10/1958 Horne, Jr. ............ F16K 11/207 137/637.4
3,998,240 A * 12/1976 Liautaud ............... F16K 19/006 251/366
5,123,445 A * 6/1992 Chung-Shan ........... F16K 11/22 251/83
8,739,826 B2 * 6/2014 Thomas .............. B29C 45/0003 137/606
8,931,500 B2 * 1/2015 Thomas ................ F16K 19/006 4/678
9,151,397 B2 * 10/2015 Pinette .................. E03C 1/0403
9,957,698 B2 * 5/2018 Pitsch ....................... E03C 1/04
11,739,509 B2 * 8/2023 Dolgos ................... F16K 11/20 236/12.13
11,892,090 B2 * 2/2024 Zhu ......................... B29C 45/33
12,122,080 B2 * 10/2024 Zhu ......................... B29C 45/36
2021/0056351 A1 * 2/2021 Peng .................... G06V 10/764
2023/0060483 A1 * 3/2023 Zhu ....................... B29C 45/332

* cited by examiner

*Primary Examiner* — Reinaldo Sanchez-Medina
(74) *Attorney, Agent, or Firm* — Bayramoglu Law Offices LLC

(57) ABSTRACT

A faucet body includes a left inlet seat, a right inlet seat, and a horizontal pipe that connects the left inlet seat to the right inlet seat. Left and right valve chambers are provided inside the left and right inlet seats, respectively. The top of the left valve chamber is open, the left valve chamber is provided with a left valve chamber inlet and a left valve chamber outlet. The top of the right valve chamber is open, the right valve chamber is provided with a right valve chamber inlet and a right valve chamber outlet. A left channel, a right channel, and a mixing chamber are provided inside the horizontal pipe. The left channel and the right channel are curved channels. A first plane where an axis of the left channel is located is not coplanar with a second plane where an axis of the right channel is located.

16 Claims, 12 Drawing Sheets

FAUCET AND FAUCET BODY THEREOF

CROSS REFERENCE TO THE RELATED APPLICATIONS

This application is based upon and claims priority to Chinese Patent Application No. 202410644889.0, filed on May 22, 2024, the entire contents of which are incorporated herein by reference.

TECHNICAL FIELD

The present disclosure relates to the technical field of faucets, and in particular to a faucet body and a faucet with the faucet body.

BACKGROUND

In the prior art, Chinese patent application CN203594847U provides an H-shaped plastic water regulation frame, which includes a concave inner core made of a highly malleable plastic and an H-shaped outer shell made of a rigid plastic. A horizontal pipe and two upward extending tubular valve seats are provided inside the inner core. A middle section of the horizontal pipe is provided with an outward leading water outlet. Two ends of the horizontal pipe are respectively connected to the valve seats. An inner hole of the horizontal pipe communicates the water outlet with inner chambers of the two valve seats at the two ends. The bottom of each valve seat is provided with a water inlet. A middle section of the outer shell is provided with a horizontal sleeve for sheathing the horizontal pipe inside the inner core and leading the water outlet outward. Two ends of the horizontal sleeve are provided with vertical pipes for sheathing the valve seats inside the inner core. An upper opening of each vertical pipe is provided with an external thread on the outer circumference, and a lower end of each vertical pipe extends downwards to form an inlet pipe with an external thread on the outer circumference. Each inlet pipe is communicated with the water inlet of the corresponding valve seat inside the inner core.

In the above prior art, a left inner hole 201 of the horizontal pipe 20 communicates an inner hole 211 of the water outlet 21 with the inner chamber 221 of a left valve seat 22, while a right inner hole 201 of the horizontal pipe 20 communicates the inner hole 211 of the water outlet 21 with the inner chamber 241 of a right valve seat 24. Due to the lack of a mixing chamber between the left inner hole 201 and the right inner hole 201, the outlet end of the left inner hole 201 is directly communicated with the outlet end of the right inner hole 201. Thus, a water flow from the left valve seat 22 and a water flow from the right valve seat 24 collide with each other directly and then flow out from the water outlet 21. In typical conditions, one of the left valve seat 22 and the right valve seat 24 introduces cold water, while the other introduces hot water. If the cold and hot water flows collide directly with each other, it will cause uneven mixing of the water, thereby affecting the stability of the outlet water temperature. In addition, generally, after the hot water flow passes through the heater, its water pressure is lower than that of the cold water flow. Therefore, when the cold and hot water flows collide directly with each other, the hot water may be oppressed by the cold water and retreat, resulting in significant fluctuations in the outlet water temperature due to the instability of the cold water pressure.

In addition, in the above prior art, the plastic water regulation frame involves gas-assisted injection molding, secondary injection molding, and a small amount of mechanical processing, resulting in complex forming processes and high manufacturing costs.

Therefore, avoiding significant fluctuations in the outlet water temperature of the H-shaped faucet body and simplifying the forming process of the H-shaped faucet body are technical problems that need to be solved by those skilled in the art.

SUMMARY

In view of the above-mentioned technical problems, an objective of the present disclosure is to provide a faucet body and a faucet with the faucet body. The present disclosure features a simple structure and effectively solves the problems in the existing faucet body, that is, significant fluctuations in the outlet water temperature and complex forming processes.

To achieve the above objective, the present disclosure adopts the following technical solutions:

A faucet body includes a left inlet seat, a right inlet seat, and a horizontal pipe, where the left inlet seat and the right inlet seat are arranged side by side; the horizontal pipe horizontally connects the left inlet seat to the right inlet seat; a left valve chamber is provided inside the left inlet seat, and a right valve chamber is provided inside the right inlet seat; a top of the left valve chamber is open, a bottom of the left valve chamber is provided with a left valve chamber inlet, and a side wall of the left valve chamber is provided with a left valve chamber outlet; and a top of the right valve chamber is open, a bottom of the right valve chamber is provided with a right valve chamber inlet, and a side wall of the right valve chamber is provided with a right valve chamber outlet;

- a left channel, a right channel, and a mixing chamber are provided inside the horizontal pipe, and the mixing chamber is located between the left channel and the right channel; the mixing chamber is provided with a left inlet, a right inlet, and an outlet; and the left channel communicates the left valve chamber outlet with the left inlet of the mixing chamber, while the right channel communicates the right valve chamber outlet with the right inlet of the mixing chamber;
- the left inlet seat, the right inlet seat, and the horizontal pipe are integrally formed by injection molding; the left channel and the right channel are curved channels and are formed by injection molding and core pulling; a mold core for forming the left channel is extracted from an opening of the top of the left valve chamber; and a mold core for forming the right channel is extracted from an opening of the top of the right valve chamber; and
- a plane P1 where an axis of the left channel is located is not coplanar with a plane P2 where an axis of the right channel is located.

In some optional or preferable implementations, the left inlet and the right inlet of the mixing chamber are staggered.

In some optional or preferable implementations, the left inlet and the right inlet of the mixing chamber are partially or completely staggered in a vertical or front-to-rear direction.

In some optional or preferable implementations, the plane P1 where the axis of the left channel is located intersects with or is parallel to the plane P2 where the axis of the right channel is located.

In some optional or preferable implementations, the left inlet of the mixing chamber is located on the plane P2 where the axis of the right channel is located, and the left valve chamber outlet is not located on the plane P2 where the axis of the right channel is located; alternatively, the left inlet of the mixing chamber is not located on the plane P2 where the axis of the right channel is located, and the left valve chamber outlet is located on the plane P2 where the axis of the right channel is located; alternatively, the left inlet of the mixing chamber and the left valve chamber outlet are not located on the plane P2 where the axis of the right channel is located; and alternatively the right inlet of the mixing chamber is located on the plane P1 where the axis of the left channel is located, and the right valve chamber outlet is not located on the plane P1 where the axis of the left channel is located; alternatively, the right inlet of the mixing chamber is not located on the plane P1 where the axis of the left channel is located, and the right valve chamber outlet is located on the plane P1 where the axis of the left channel is located; and alternatively, the right inlet of the mixing chamber and the right valve chamber outlet are not located on the plane P1 where the axis of the left channel is located.

In some optional or preferable implementations, water flows entering the mixing chamber from the left inlet and the right inlet of the mixing chamber form a rotational flow along an inner circumferential wall of the mixing chamber.

In some optional or preferable implementations, the water flows entering the mixing chamber from the left inlet and the right inlet of the mixing chamber enter respectively along tangential directions of the inner circumferential wall of the mixing chamber.

In some optional or preferable implementations, the left valve chamber is cylindrical, and the plane P1 where the axis of the left channel is located is coplanar with a plane passing through an axis of the left valve chamber; and the right valve chamber is cylindrical, and the plane P2 where the axis of the right channel is located is coplanar with a plane passing through an axis of the right valve chamber.

In some optional or preferable implementations, the left valve chamber and the right valve chamber are cylindrical; and an axis X3 of the outlet of the mixing chamber is not located on a plane passing through an axis X1 of the left valve chamber and an axis X2 of the right valve chamber.

In some optional or preferable implementations, the axis X3 of the outlet of the mixing chamber intersects with or is parallel to the plane passing through the axis X1 of the left valve chamber and the axis X2 of the right valve chamber.

In some optional or preferable implementations, the left valve chamber inlet is integrated with a left inlet pipe, and the right valve chamber inlet is integrated with a right inlet pipe; the left inlet pipe is coaxial with the left valve chamber, and the right inlet pipe is coaxial with the right valve chamber; each of an outer wall of the left inlet pipe and an outer wall of the right inlet pipe is provided with an insert-molded external threaded sleeve with an external thread; and the external threaded sleeve is made of stainless steel, zinc alloy, aluminum, or copper.

In some optional or preferable implementations, the left valve chamber inlet is integrated with a left inlet pipe, and the right valve chamber inlet is integrated with a right inlet pipe; the left inlet pipe is coaxial with the left valve chamber, and the right inlet pipe is coaxial with the right valve chamber; and each of an outer wall of the left inlet pipe and an outer wall of the right inlet pipe is integrated with an external thread.

In addition, the present disclosure further provides a faucet, including an H-shaped faucet body, a left valve trim, and a right valve trim, where the faucet body is the faucet body described in any of the above paragraphs; the left valve trim is located in the left valve chamber, and the right valve trim is located in the right valve chamber; the left valve chamber inlet is communicated with a cold water source; and the right valve chamber inlet is communicated with a hot water source.

Compared with the prior art, the present disclosure has the following beneficial effects:

1. In the present disclosure, a left channel, a right channel, and a mixing chamber are provided inside the horizontal pipe, and the mixing chamber is located between the left channel and the right channel. The mixing chamber is provided with a left inlet, a right inlet, and an outlet. The left channel communicates the left valve chamber outlet with the left inlet of the mixing chamber, while the right channel communicates the right valve chamber outlet with the right inlet of the mixing chamber. Through the mixing chamber, a water flow in the left channel and a water flow the right channel will not directly collide in opposite directions before flowing out of the water outlet (as in the prior art CN203594847U). On the contrary, both of these water flows enter the mixing chamber and mix in the mixing chamber before flowing out of the water outlet. The design maintains the stability of the outlet water temperature after the mixing of hot and cold water.
2. The plane P1 where an axis of the left channel is located is not coplanar with the plane P2 where an axis of the right channel is located. When the water flows in the two channels are mixed, the water flows in the left channel and the right channel will not directly collide in opposite directions, thereby achieving the following beneficial effects. On the one hand, regardless of whether the water pressure is high or low, the water flows in the left channel and the right channel can enter the mixing chamber and mix stably in the mixing chamber. On the other hand, a water flow with a higher water pressure (cold water flow) will not directly collide with a water flow with a lower water pressure (hot water flow) in opposite directions, avoiding oppressing and returning the water flow with a lower water pressure (as in the prior art). The design effectively solves the problem of significant fluctuations in outlet water temperature due to unstable cold water pressure (higher water pressure), achieving uniform mixing of cold and hot water. Especially in this solution, due to the fact that the plane P1 and the plane P2 are not coplanar, when the outlet of the mixing chamber is connected to a water outlet terminal with a high pipe resistance (such as a water outlet with a bubbler), the cold and hot water will not directly collide in opposite directions, significantly reducing the phenomenon of cold water oppressing hot water.
3. The left inlet seat, the right inlet seat, and the horizontal pipe are integrally formed by injection molding. The left channel and the right channel are curved channels and are formed by injection molding and core pulling. A mold core for forming the left channel is extracted from the opening of the top of the left valve chamber. A mold core for forming the right channel is extracted from the opening of the top of the right valve chamber. In this design, the left channel and the right channel can be easily formed by injection molding and core pulling, without the need to form processing holes for forming the left channel and the right channel of the faucet body or to seal the processing holes. The design improves the sealing and strength of the entire faucet body, and eases the manufacture.

BRIEF DESCRIPTION OF THE DRAWINGS

The drawings described herein are provided for further understanding of the present disclosure, and constitute a part of the present disclosure. The exemplary embodiments and illustrations of the present disclosure are intended to explain the present disclosure, but do not constitute inappropriate limitations to the present disclosure.

Drawings.

REFERENCE NUMERALS

Figure 1:
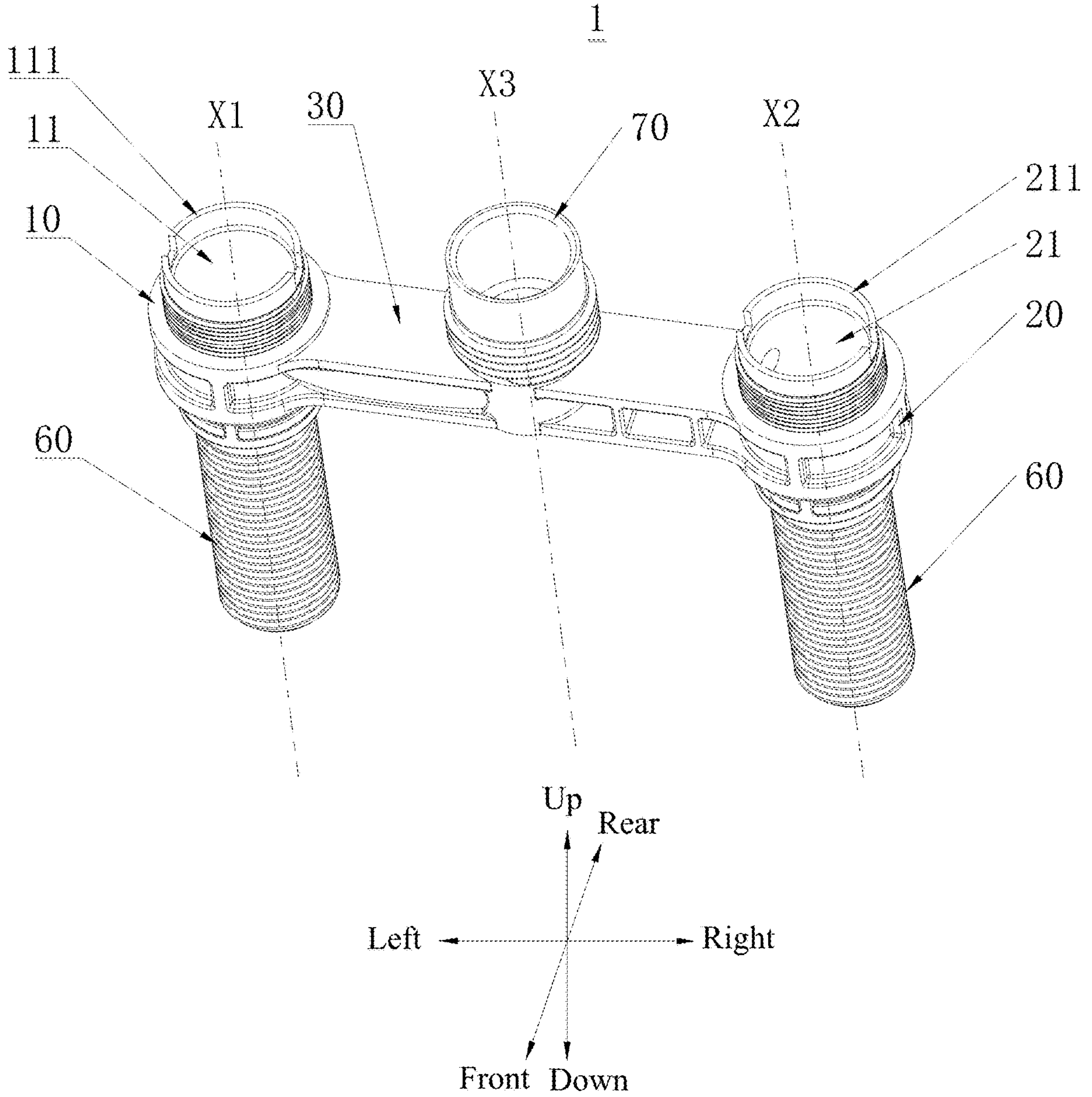
FIG. 1 is a three-dimensional structural diagram of a faucet body according to a first embodiment of the present disclosure.
Figure 2:
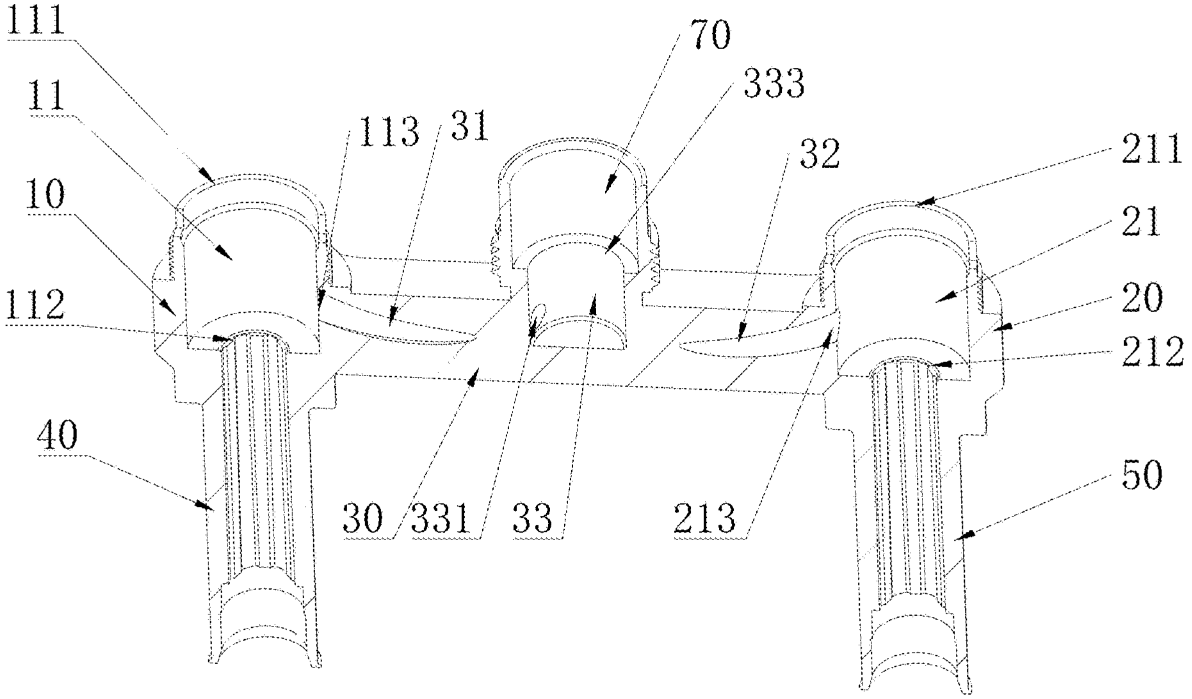
FIG. 2 is a longitudinal section view of the faucet body according to the first embodiment of the present disclosure.

- 1. faucet body; 2. left valve trim; 3. right valve trim; and 4. outlet pipe;
- 10. left inlet seat; 11. left valve chamber; 111. opening of left valve chamber; 112. left valve chamber inlet; and 113. left valve chamber outlet;
- 20. right inlet seat; 21. right valve chamber; 211. opening of right valve chamber; 212. right valve chamber inlet; and 213. right valve chamber outlet;
- 30. horizontal pipe; 31. left channel; 32. right channel; 33. mixing chamber; 331. left inlet of mixing chamber; 332. right inlet of mixing chamber; and 333. outlet of mixing chamber;

- 40. left inlet pipe;
- 50. right inlet pipe;
- 60. external threaded sleeve;
- 70. outlet joint;
- X1. axis of left valve chamber; X2. axis of right valve chamber; and X3. axis of outlet of mixing chamber; and
- P1. plane where axis of left channel is located; and P2. plane where axis of right channel is located.

DETAILED DESCRIPTION OF THE EMBODIMENTS

To make the to-be-resolved technical problems, the technical solutions, and the beneficial effects of the present disclosure clearer, the present disclosure is described in further detail below with reference to the drawings and embodiments. It should be understood that the specific embodiments described herein are merely intended to explain the present disclosure, but not to limit the present disclosure.

For the convenience of description, the orientations of front, rear, left, right, top, and bottom described in the present disclosure can be found in FIGS. 1, 12, 13, and 14.

As shown in FIGS. 1 to 6, a first embodiment of the present disclosure provides faucet body 1, including left inlet seat 10, right inlet seat 20, and horizontal pipe 30. The left inlet seat 10 and the right inlet seat 20 are arranged side by side. The horizontal pipe 30 horizontally connects the left inlet seat 10 to the right inlet seat 20. Left valve chamber 11 is provided inside the left inlet seat 10, and right valve chamber 21 is provided inside the right inlet seat 20. The top of the left valve chamber 11 is open, the bottom of the left valve chamber 11 is provided with left valve chamber inlet 112, and a side wall of the left valve chamber 11 is provided with left valve chamber outlet 113. The top of the right valve chamber 21 is open, the bottom of the right valve chamber 21 is provided with right valve chamber inlet 212, and a side wall of the right valve chamber 21 is provided with right valve chamber outlet 213.

Left channel 31, right channel 32, and mixing chamber 33 are provided inside the horizontal pipe 30, the mixing chamber 33 is located between the left channel 31 and the right channel 32. The mixing chamber 33 is provided with left inlet 331, right inlet 332, and outlet 333. The left channel 31 communicates the left valve chamber outlet 113 with the left inlet 331 of the mixing chamber, while the right channel 32 communicates the right valve chamber outlet 213 with the right inlet 332 of the mixing chamber. That is, the left valve chamber outlet 113 forms an inlet end of the left channel 31, and the left inlet 331 of the mixing chamber forms an outlet end of the left channel 31. Similarly, the right valve chamber outlet 213 forms an inlet end of the right channel 32, and the right inlet 332 of the mixing chamber forms an outlet end of the right channel 32. Through the mixing chamber 33, a water flow in the left channel 31 and a water flow the right channel 32 will not directly collide in opposite directions before flowing out of the water outlet (as in the prior art CN203594847U). On the contrary, both of these water flows enter the mixing chamber 33 and mix in the mixing chamber 33 before flowing out of a water outlet. The design maintains the stability of the outlet water temperature after the mixing of hot and cold water.

The left inlet seat 10, the right inlet seat 20, and the horizontal pipe 30 are integrally formed by injection molding. The left channel 31 and the right channel 32 are curved channels that can be formed by injection molding and core pulling. A mold core for forming the left channel 31 is extracted from opening 111 of the top of the left valve chamber 11, and a mold core for forming the right channel 32 is extracted from opening 211 of the top of the right valve chamber 21. Due to the fact that the left channel 31 and the right channel 32 are curved channels, the left channel 31 and the right channel 32 can be easily formed by injection molding and core pulling, without the need to form processing holes for forming the left channel 31 and the right channel 32 of the faucet body 1 or to seal the processing holes. The design improves the sealing and strength of the entire faucet body 1, and eases the manufacture.

Plane P1 where an axis of the left channel 31 is located is not coplanar with plane P2 where an axis of the right channel 32 is located. When the water flows in the two channels are mixed, the water flows in the left channel 31 and the right channel 32 will not directly collide in opposite directions, thereby achieving the following beneficial effects. On the one hand, regardless of whether the water pressure is high or low, the water flows in the left channel 31 and the right channel 32 can enter the mixing chamber 33 and mix stably in the mixing chamber 33. On the other hand, a water flow with a higher water pressure (cold water flow) will not directly collide with a water flow with a lower water pressure (hot water flow) in opposite directions, avoiding oppressing and returning the water flow with a lower water pressure (as in the prior art). The design effectively solves the problem of significant fluctuations in outlet water temperature due to unstable cold water pressure (higher water pressure), achieving uniform mixing of cold and hot water. Especially in this solution, due to the fact that the plane P1 and the plane P2 are not coplanar, when the outlet 333 of the mixing chamber is connected to a water outlet terminal with a high pipe resistance (such as a water outlet with a bubbler), the cold and hot water will not directly collide in opposite directions, significantly reducing the phenomenon of cold water oppressing hot water.

Preferably, in this embodiment, the left inlet 331 and the right inlet 332 of the mixing chamber are staggered. Due to the staggered arrangement of the two inlets of the mixing chamber 33, the two water flows entering the mixing chamber 33 will not directly collide in opposite directions. Of course, it is necessary to note that the left inlet 331 and the right inlet 332 of the mixing chamber may not be staggered, but are arranged at a same position in vertical and front-to-rear directions. Due to the fact that the plane P1 where the axis of the left channel 31 is located and the plane P2 where the axis of the right channel 32 is located are not coplanar, the water inlet directions of the left inlet 331 and the right inlet 332 of the mixing chamber will inevitably not be opposite. That is to say, even if the left inlet 331 and the right inlet 332 of the mixing chamber are not staggered, the water flows will not directly collide in opposite directions. In a specific implementation, these two inlets may not be staggered, as long as the two water flows entering the mixing chamber 33 do not directly collide in opposite directions.

Figure 3:
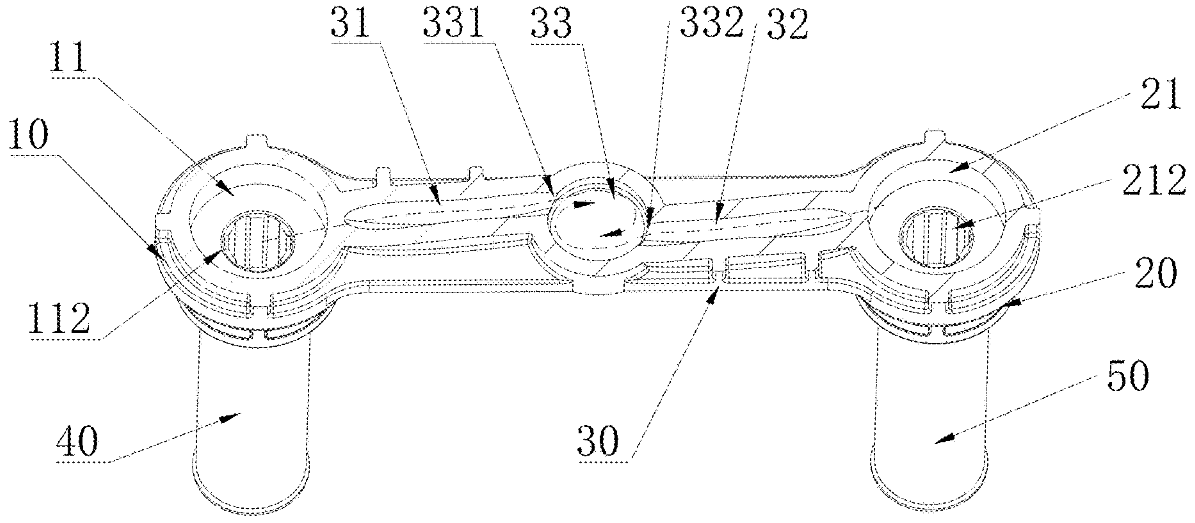
FIG. 3 is a transverse section view of the faucet body according to the first embodiment of the present disclosure.

As shown in FIG. 3, in this embodiment, specifically, the left inlet 331 and the right inlet 332 of the mixing chamber are completely staggered in the front-to-rear direction. It can be understood that in other embodiments, the left inlet 331 and the right inlet 332 of the mixing chamber can also be partially staggered in the front-to-rear direction. And/or, the left inlet 331 and the right inlet 332 of the mixing chamber can also be partially or completely staggered in the vertical direction. The direction in which the left inlet 331 and the right inlet 332 of the mixing chamber are staggered, as well as whether to use a partially staggered design or a completely staggered design, can be determined as needed without any restrictions.

The plane P1 where the axis of the left channel 31 is located and the plane P2 where the axis of the right channel 32 is located can intersect or be parallel, such that the two planes are not coplanar. Specifically, the left inlet 331 of the mixing chamber is located on the plane P2 where the axis of the right channel is located, and the left valve chamber outlet 113 is not located on the plane P2 where the axis of the right channel is located. Alternatively, the left inlet 331 of the mixing chamber is not located on the plane P2 where the axis of the right channel is located, and the left valve chamber outlet 113 is located on the plane P2 where the axis of the right channel is located. Alternatively, the left inlet 331 of the mixing chamber and the left valve chamber outlet 113 are not located on the plane P2 where the axis of the right channel is located.

Alternatively, the right inlet 332 of the mixing chamber is located on the plane P1 where the axis of the left channel is located, and the right valve chamber outlet 213 is not located on the plane P1 where the axis of the left channel is located. Alternatively, the right inlet 332 of the mixing chamber is not located on the plane P1 where the axis of the left channel is located, and the right valve chamber outlet 213 is located on the plane P1 where the axis of the left channel is located. Alternatively, the right inlet 332 of the mixing chamber and the right valve chamber outlet 213 are not located on the plane P1 where the axis of the left channel is located.

Figure 4:
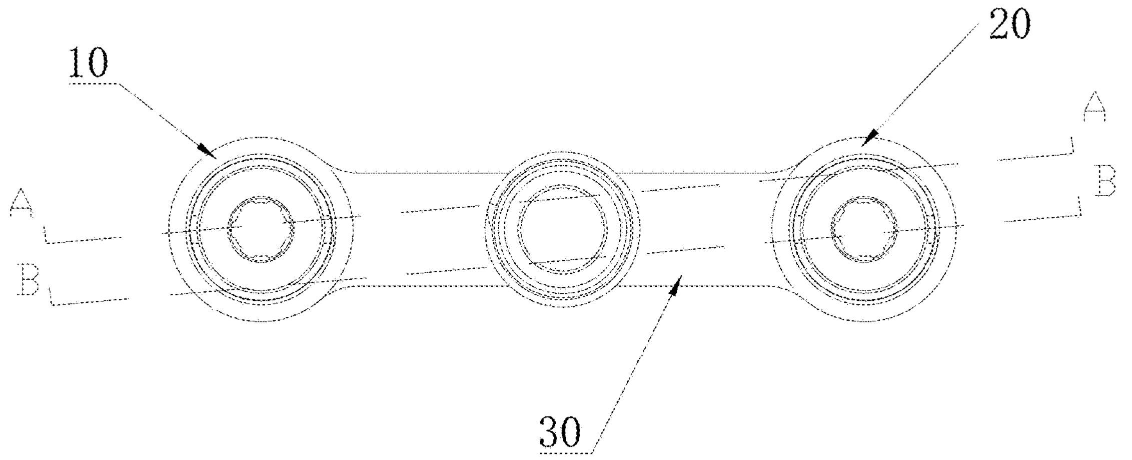
FIG. 4 is a top view of the faucet body according to the first embodiment of the present disclosure.
Figure 5:
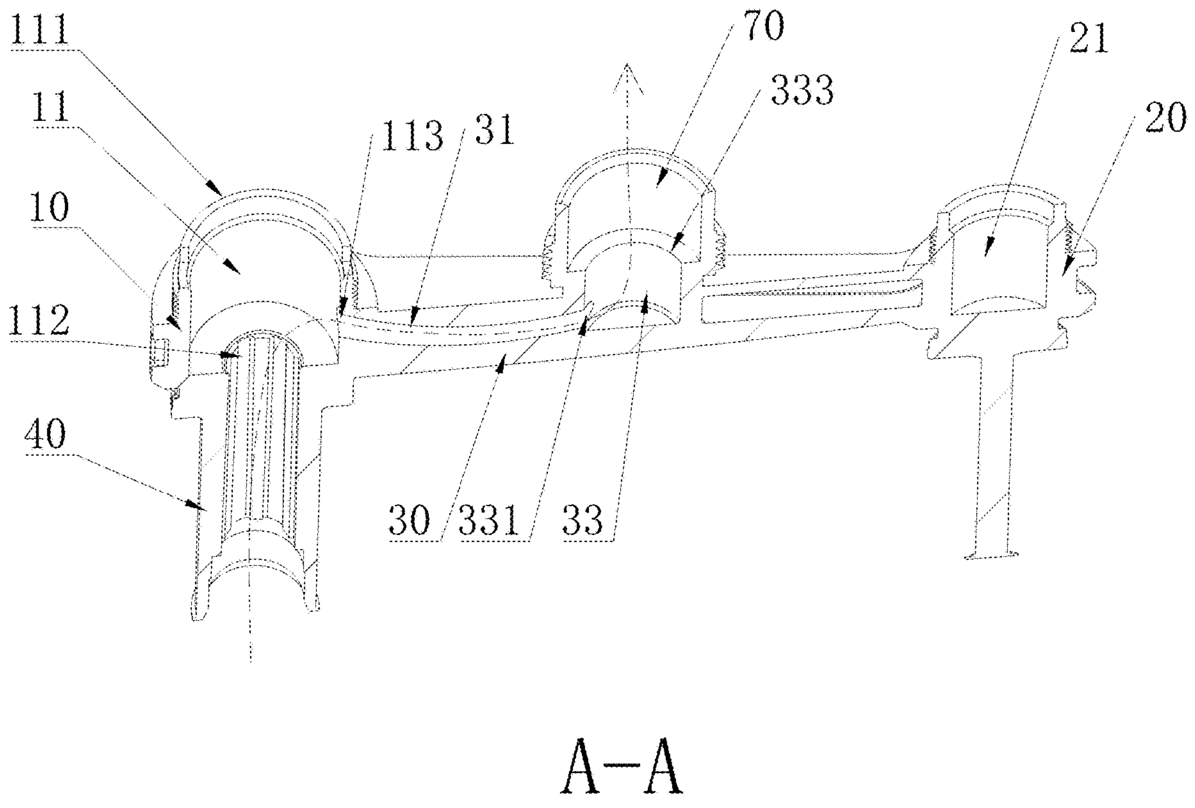
FIG. 5 is a section view taken along line A-A shown in FIG. 4.
Figure 6:
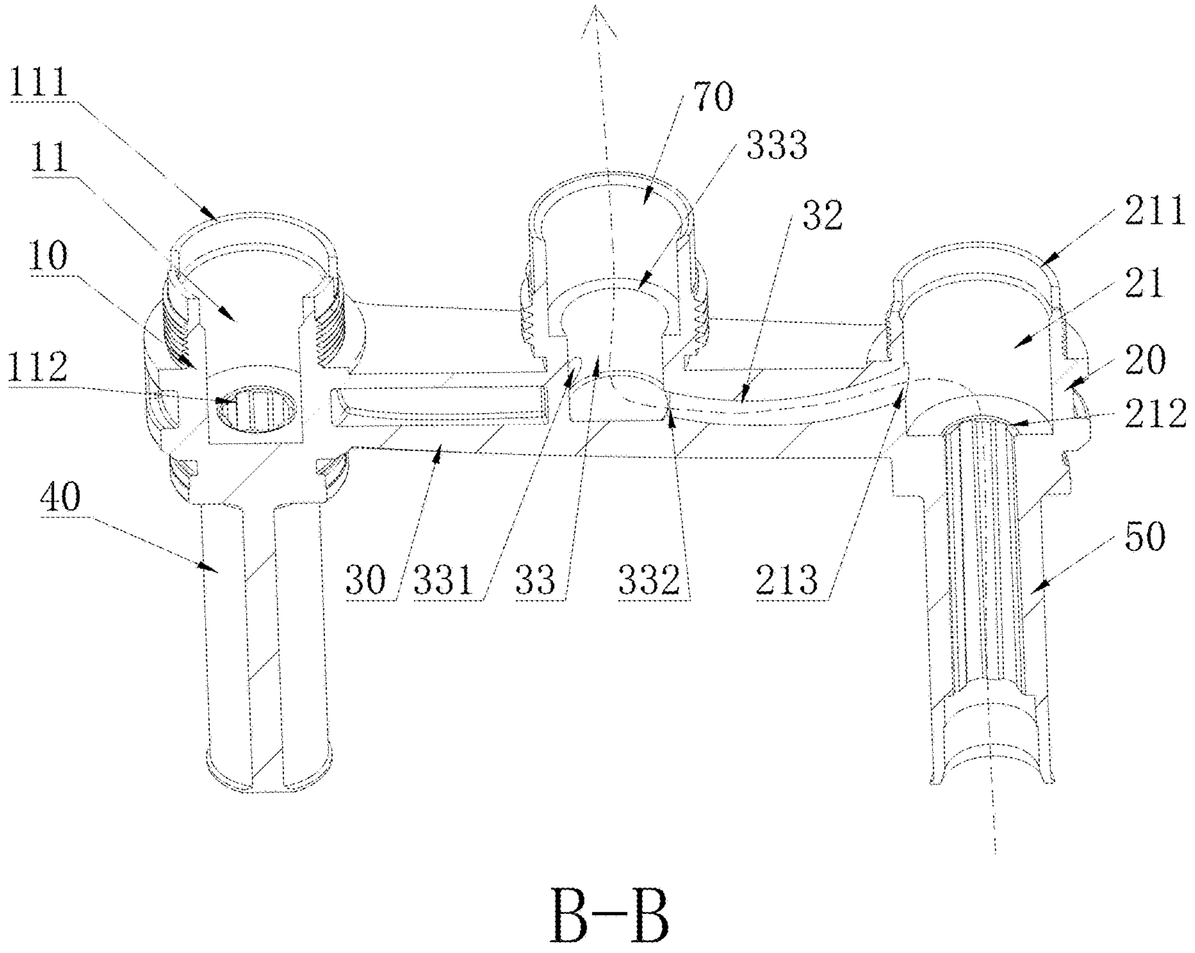
FIG. 6 is a section view taken along line B-B shown in FIG. 4.
Figure 7:
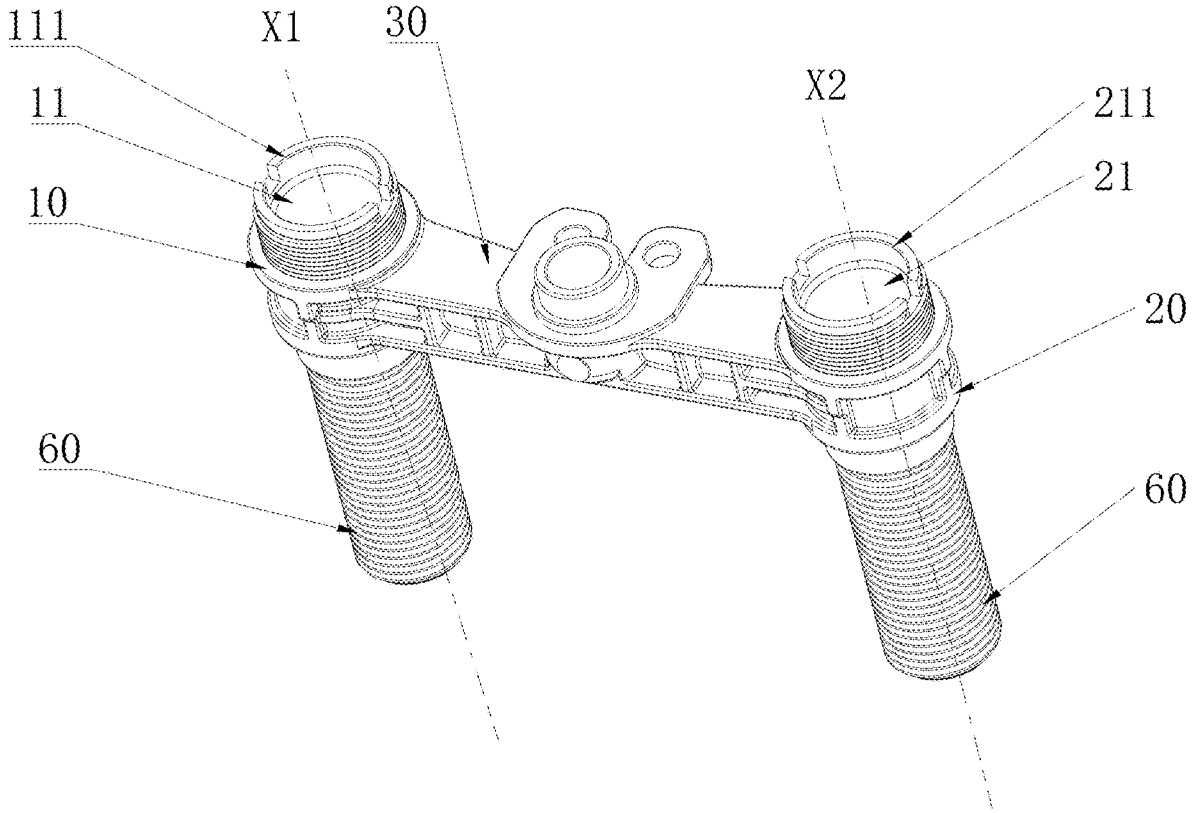
FIG. 7 is a three-dimensional structural diagram of a faucet body according to a second embodiment of the present disclosure.
Figure 8:
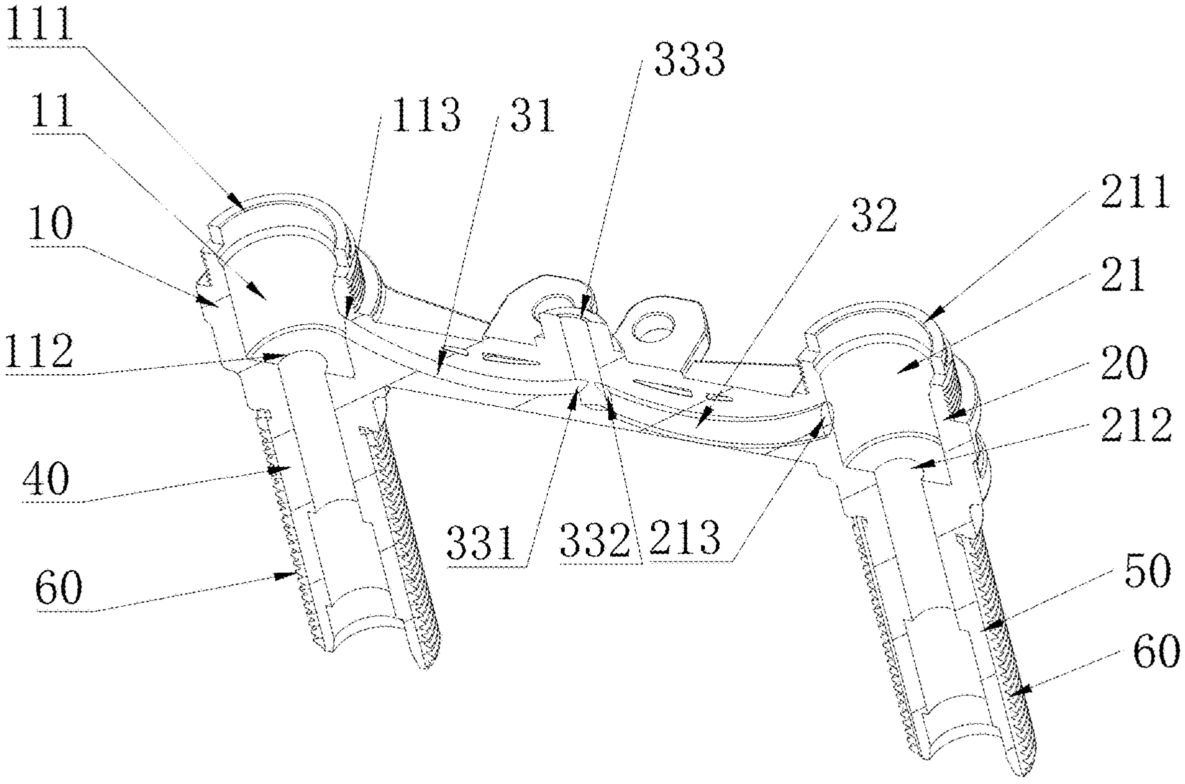
FIG. 8 is a longitudinal section view of the faucet body according to the second embodiment of the present disclosure.
Figure 9:
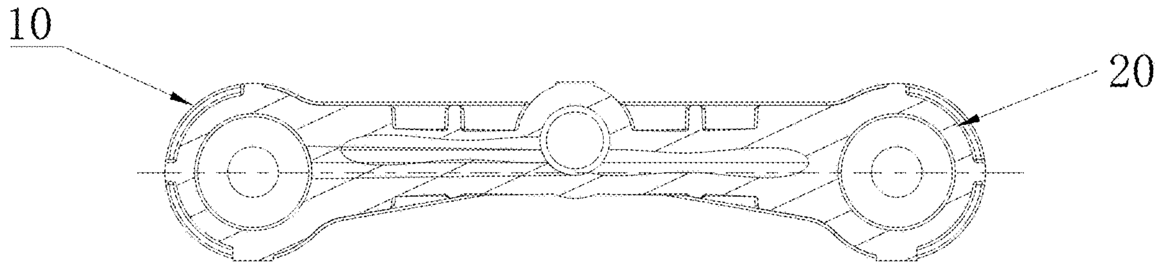
FIG. 9 is a first transverse section view of the faucet body according to the second embodiment of the present disclosure.
Figure 10:
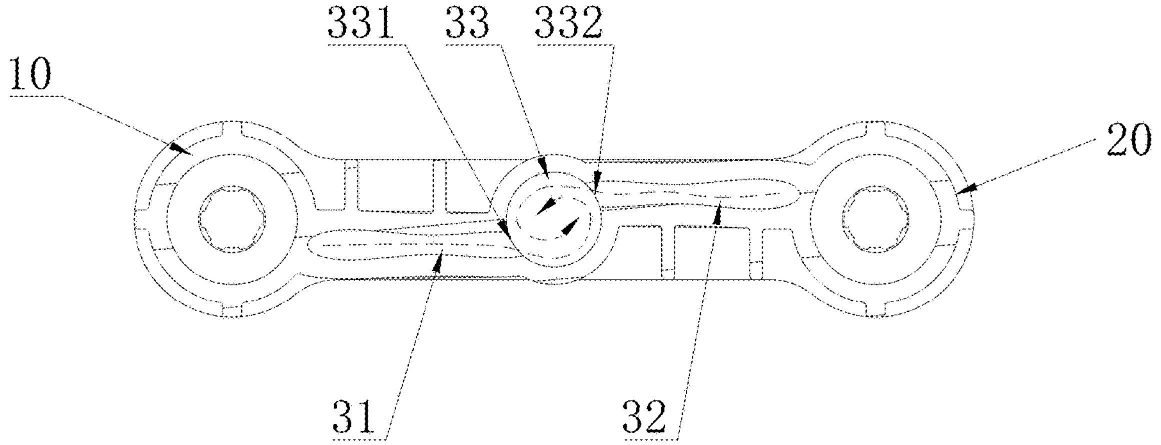
FIG. 10 is a second transverse section view of the faucet body according to the second embodiment of the present disclosure.

In this embodiment, as shown in FIG. 4, section A-A refers to the plane P1 where the axis of the left channel 31 is located, and section B-B refers to the plane P2 where the axis of the right channel is located. The plane P1 where the axis of the left channel 31 is located is parallel to the plane P2 where the axis of the right channel 32 is located. In this way, the left inlet 331 of the mixing chamber and the left valve chamber outlet 113 are not located on the plane P2 where the axis of the right channel is located. Similarly, the right inlet 332 of the mixing chamber and the right valve chamber outlet 213 are not located on the plane P1 where the axis of the left channel is located.

Preferably, the water flow entering the mixing chamber 33 from the left inlet 331 of the mixing chamber and the water flow entering the right inlet 332 of the mixing chamber form a rotational flow along an inner circumferential wall of the mixing chamber 33. The arrow inside the mixing chamber 33 in FIG. 3 indicates the direction of the rotational flow formed by the two water flows. More preferably, in this embodiment, the water flows entering the mixing chamber 33 from the left inlet 331 and the right inlet 332 of the mixing chamber enter respectively along tangential directions of the inner circumferential wall of the mixing chamber 33. The water flows are mixed into a rotational flow in the mixing chamber 33, achieving uniform and stable mixing of the water flows, facilitating stable control of outlet water temperature.

In this embodiment, the left valve chamber 11 is cylindrical, and the plane P1 where the axis of the left channel 31 is located is coplanar with a plane passing through an axis of the left valve chamber 11. The right valve chamber 21 is cylindrical, and the plane P2 where the axis of the right channel 32 is located is coplanar with a plane passing through an axis of the right valve chamber 21. In this way, the inlet end of the left channel 31 (the left valve chamber outlet 113) is located on the plane passing through the axis of the left valve chamber 11 (i.e. the left valve chamber outlet 113 is in a diameter direction of the left valve chamber 11). Similarly, the inlet end of the right channel 32 (the right valve chamber outlet 213) is located on the plane passing through the axis of the right valve chamber 21 (i.e. the right valve chamber outlet 213 is in a diameter direction of right valve chamber 21). When the left channel 31 and the right channel 32 are formed by injection molding and core pulling, a radial space of the left valve chamber 11 and a radial space of the right valve chamber 21 are maximally utilized, making core pulling easy and reliable, and reducing the radial dimensions of the left valve chamber 11 and the right valve chamber 21.

In this embodiment, the left valve chamber 11 and the right valve chamber 21 are cylindrical. Axis X3 of the outlet 333 of the mixing chamber is located on a plane passing through the axis X1 of the left valve chamber 11 and the axis X2 of the right valve chamber 21. That is, the axis X3 of the outlet 333 of the mixing chamber, the axis X1 of the left valve chamber 11, and the axis X2 of the right valve chamber 21 are on the same plane.

In this embodiment, the left valve chamber inlet 112 is provided with integrally formed left inlet pipe 40, and the right valve chamber inlet 212 is provided with integrally formed right inlet pipe 50. The left inlet pipe 40 is coaxial with the left valve chamber 11, and the right inlet pipe 50 is coaxial with the right valve chamber 21. Each of an outer wall of the left inlet pipe 40 and an outer wall of the right inlet pipe 50 is provided with insert-molded external threaded sleeve 60 with an external thread. The external threaded sleeve 60 can be made of a material such as stainless steel, zinc alloy, aluminum, or copper. The strength of the external threaded sleeve 60 is greater than that of the left inlet pipe 40 and the right inlet pipe 50. In other embodiments, the external threaded sleeve 60 may not be provided, and the external threads are directly formed on the outer walls of the left inlet pipe 40 and the right inlet pipe 50.

In this embodiment, the outlet 333 of the mixing chamber is connected to integrally formed outlet joint 70. That is, the outlet joint 70 is integrally formed with the left inlet seat 10, the right inlet seat 20, and the horizontal pipe 30 by injection molding. An axis of the outlet joint 70 is parallel to an axis of the left inlet pipe 40 and an axis of the right inlet pipe 50. An outer wall of the outlet joint 70 is provided with an external thread. In other embodiments, the outlet joint 70 can also be formed separately and connected to the outlet 333 of the mixing chamber through clamping, threaded connection, or welding, etc.

As shown in FIGS. 7 to 10, a second embodiment of the present disclosure provides faucet body 1, which differs mainly from the first embodiment in the following aspects. In the first embodiment, the axis X3 of the outlet 333 of the mixing chamber is located on the plane passing through the axis X1 of the left valve chamber 11 and the axis X2 of the right valve chamber 21. That is, the axis X3 of the outlet 333 of the mixing chamber, the axis X1 of the left valve chamber 11, and the axis X2 of the right valve chamber 21 are on the same plane. In this embodiment, the axis X3 of the outlet 333 of the mixing chamber is not located on the plane passing through the axis X1 of the left valve chamber 11 and the axis X2 of the right valve chamber 21, but the axis X3 of the outlet 333 of the mixing chamber is parallel to the plane passing through the axis X1 of the left valve chamber 11 and the axis X2 of the right valve chamber 21. In this embodiment, the axis X3 of the outlet 333 of the mixing chamber is not located on the plane passing through the axis X1 of the left valve chamber 11 and the axis X2 of the right valve chamber 21. In this way, a mold for forming the outlet 333 of the mixing chamber, a mold for forming the left valve chamber 11, and a mold for forming the right valve chamber 21 are staggered horizontally, fully utilizing the horizontal space and facilitating mold layout.

Figure 11:
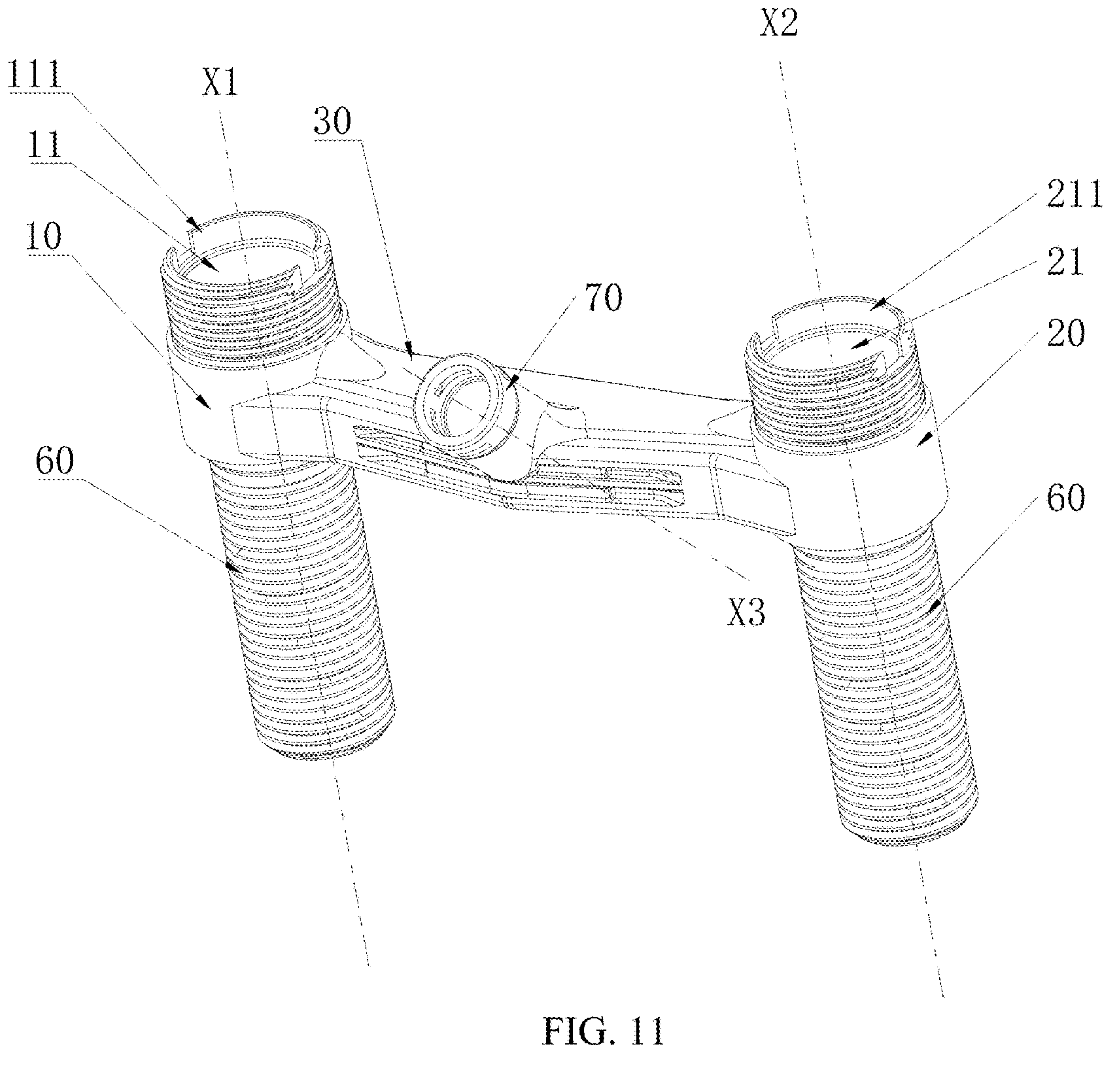
FIG. 11 is a three-dimensional structural diagram of a faucet body according to a third embodiment of the present disclosure.

As shown in FIG. 11, a third embodiment of the present disclosure provides faucet body 1, which differs mainly from the first embodiment in the following aspects. In the first embodiment, the axis X3 of the outlet 333 of the mixing chamber is located on the plane passing through the axis X1 of the left valve chamber 11 and the axis X2 of the right valve chamber 21. That is, the axis X3 of the outlet 333 of the mixing chamber, the axis X1 of the left valve chamber 11, and the axis X2 of the right valve chamber 21 are on the same plane. In this embodiment, the axis X3 of the outlet 333 of the mixing chamber is not located on the plane passing through the axis X1 of the left valve chamber 11 and the axis X2 of the right valve chamber 21, but the axis X3 of the outlet 333 of the mixing chamber intersects with the plane passing through the axis X1 of the left valve chamber 11 and the axis X2 of the right valve chamber 21.

Figure 12:
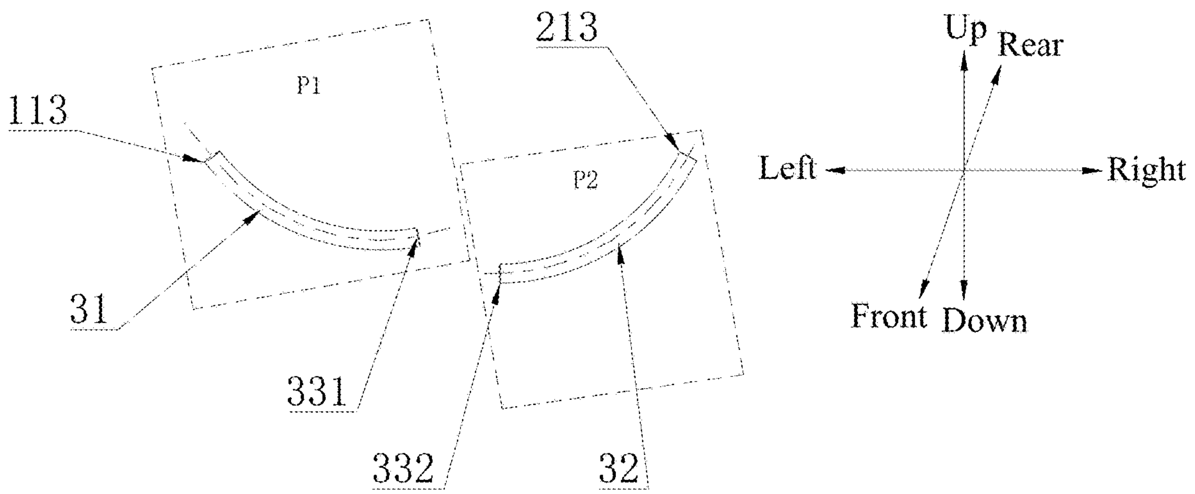
FIG. 12 is a schematic diagram showing positions of a left channel and a right channel according to a fourth embodiment of the present disclosure.

As shown in FIG. 12, a fourth embodiment of the present disclosure provides faucet body 1, which differs mainly from the first embodiment in the following aspects. In the first embodiment, the left inlet 331 and the right inlet 332 of the mixing chamber are only staggered in the front-to-rear direction. In this embodiment, the left inlet 331 and the right inlet 332 of the mixing chamber are staggered in the front-to-rear direction and a top-to-bottom direction. Like in the first embodiment, in this embodiment, the plane P1 where the axis of the left channel is located and the plane P2 where the axis of the right channel is located are parallel.

Figure 13:
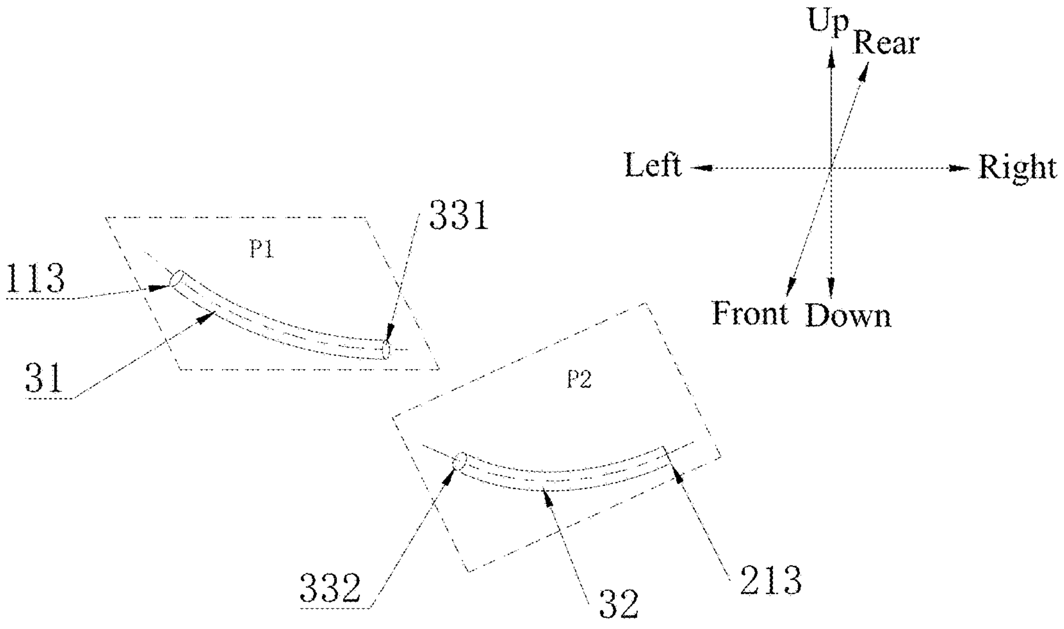
FIG. 13 is a schematic diagram showing positions of a left channel and a right channel according to a fifth embodiment of the present disclosure.

As shown in FIG. 13, a fifth embodiment of the present disclosure provides faucet body 1, which differs mainly from the first embodiment in the following aspects. In the first embodiment, the plane P1 where the axis of the left channel is located is parallel to the plane P2 where the axis of the right channel is located. In this embodiment, the plane P1 where the axis of the left channel is located intersects with the plane P2 where the axis of the right channel is located. Like in the first embodiment, in this embodiment, the inlet end of the left channel 31 (the left valve chamber outlet 113) and the outlet end of the left channel 31 (the left inlet 331 of mixing chamber) are not located on the plane P2 where the axis of the right channel is located. Similarly, the inlet end of the right channel 32 (the right valve chamber outlet 213) and the outlet end of the right channel 32 (the right inlet 332 of the mixing chamber) are not located on the plane P1 where the axis of the left channel is located.

Figure 14:
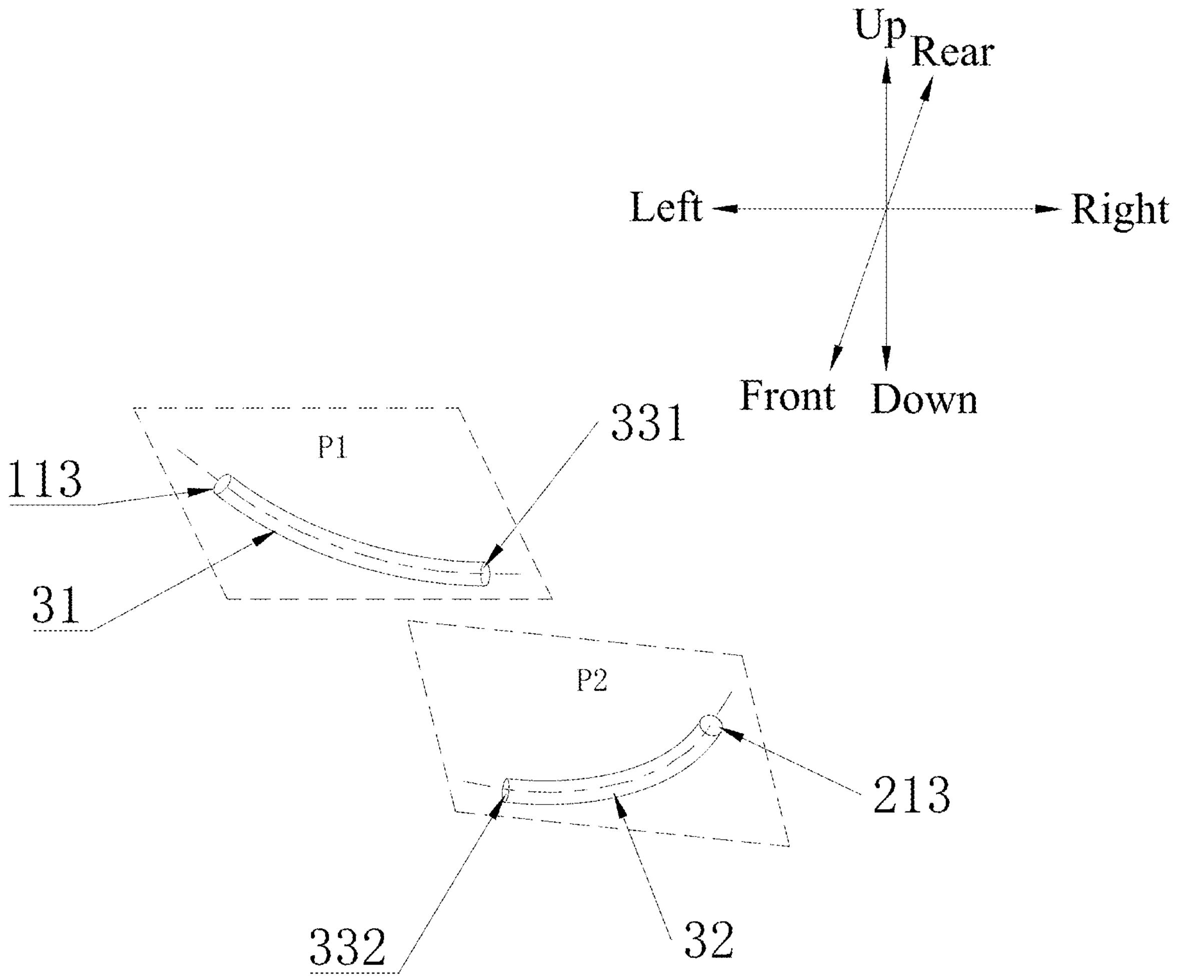
FIG. 14 is a schematic diagram showing positions of a left channel and a right channel according to a sixth embodiment of the present disclosure.

As shown in FIG. 14, a sixth embodiment of the present disclosure provides faucet body 1, which differs mainly from the first embodiment in the following aspects. In the first embodiment, the plane P1 where the axis of the left channel is located is parallel to the plane P2 where the axis of the right channel is located. The inlet end of the left channel 31 (the left valve chamber outlet 113) and the outlet end of the left channel 31 (the left inlet 331 of the mixing chamber) are not located on the plane P2 where the axis of the right channel is located. Similarly, the inlet end of the right channel 32 (the right valve chamber outlet 213) and the outlet end of the right channel 32 (the right inlet 332 of the mixing chamber) are not located on the plane P1 where the axis of the left channel is located. In this embodiment, the plane P1 where the axis of the left channel is located intersects with the plane P2 where the axis of the right channel is located. In addition, one of the inlet end of the left channel 31 (the left valve chamber outlet 113) and the outlet end of the left channel 31 (the left inlet 331 of mixing chamber) is located on the plane P2 where the axis of the right channel is located. Alternatively, one of the inlet end of the right channel 32 (the right valve chamber outlet 213) and the outlet end of the right channel 32 (the right inlet 332 of the mixing chamber) is located on the plane P1 where the axis of the left channel is located. In this embodiment, specifically, the inlet end of the right channel 32 (the right valve chamber outlet 213) is located on the plane P1 where the axis of the left channel is located.

Figure 15:
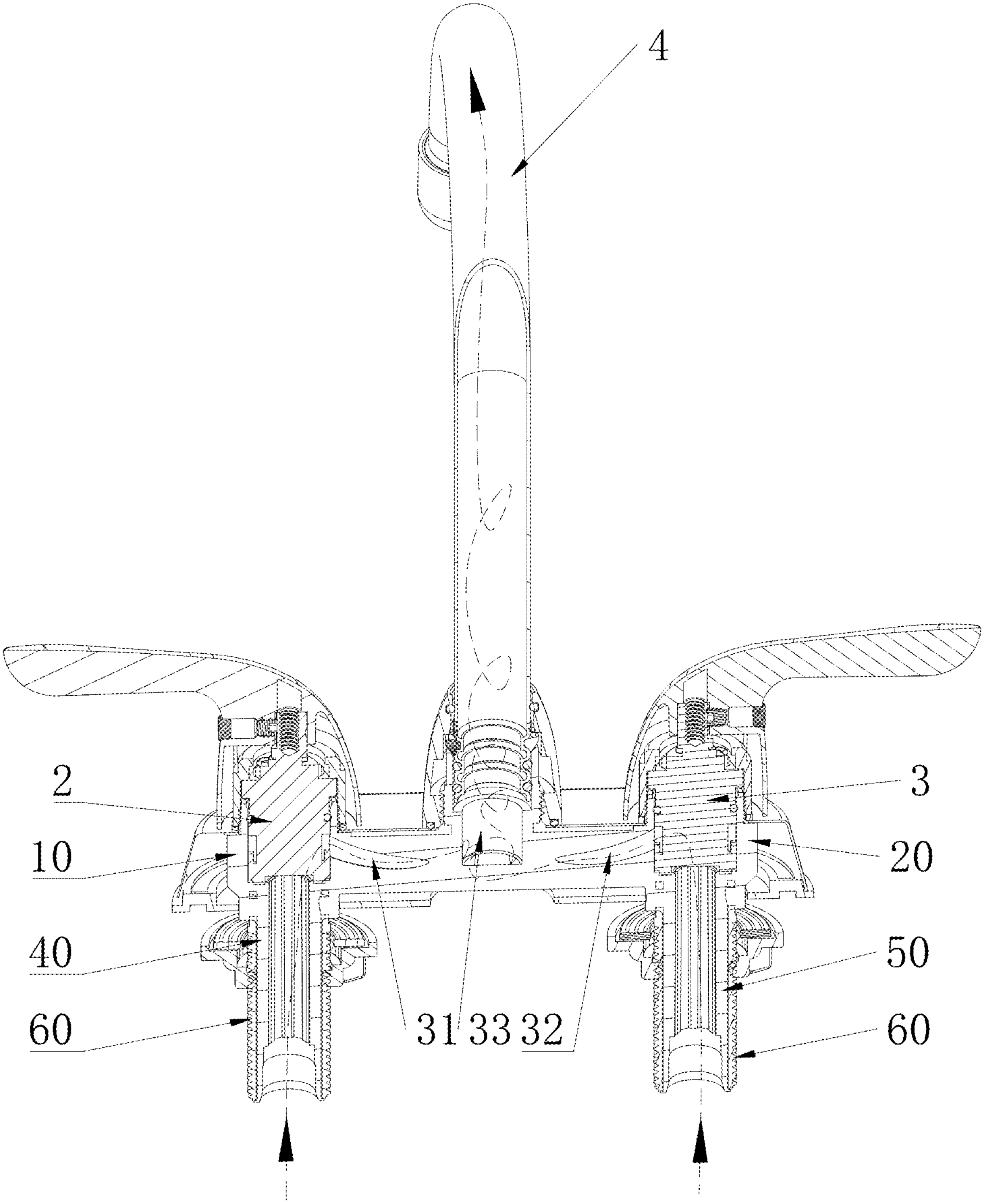
FIG. 15 is a section view of a faucet according to a seventh embodiment of the present disclosure.

As shown in FIG. 15, a seventh embodiment of the present disclosure provides a faucet, including an H-shaped faucet body, left valve trim 2, and right valve trim 3. The faucet body 1 is the faucet body 1 described in any of the above embodiments. The left valve trim 2 is located in the left valve chamber 11, and the right valve trim 3 is located in the right valve chamber 21. The left valve chamber inlet 112 is communicated with a cold water source, and the right valve chamber inlet 212 is communicated with a hot water source. The outlet 333 of the mixing chamber is connected to curved outlet pipe 4. The left valve trim 2 and the right valve trim 3 adopt existing known structures. The left valve trim 2 is configured to control connection and disconnection between the left valve chamber inlet 112 and the left valve chamber outlet 113, while right valve trim 3 is configured to control connection and disconnection between the right valve chamber inlet 212 and the right valve chamber outlet 213.

The present disclosure has been exemplarily described with reference to the drawings above. Apparently, the specific design of the present disclosure is not limited by the foregoing manner. Various non-substantial improvements made by using the concept and technical solutions of the present disclosure or direct application of the concept and the technical solutions of the present disclosure to other occasions without improvement shall fall within the protection scope of the present disclosure.

What is claimed is:

1. A faucet body, comprising a left inlet seat, a right inlet seat, and a horizontal pipe, wherein the left inlet seat and the right inlet seat are arranged side by side; the horizontal pipe horizontally connects the left inlet seat to the right inlet seat; a left valve chamber is provided inside the left inlet seat, and a right valve chamber is provided inside the right inlet seat; a top of the left valve chamber is open, a bottom of the left valve chamber is provided with a left valve chamber inlet, and a side wall of the left valve chamber is provided with a left valve chamber outlet; and a top of the right valve chamber is open, a bottom of the right valve chamber is provided with a right valve chamber inlet, and a side wall of the right valve chamber is provided with a right valve chamber outlet;

a left channel, a right channel, and a mixing chamber are provided inside the horizontal pipe, and the mixing chamber is located between the left channel and the right channel; the mixing chamber is provided with a left inlet, a right inlet, and an outlet; and the left channel communicates the left valve chamber outlet with the left inlet of the mixing chamber, while the right channel communicates the right valve chamber outlet with the right inlet of the mixing chamber;

the left inlet seat, the right inlet seat, and the horizontal pipe are integrally formed by injection molding; the left channel and the right channel are curved channels and are formed by injection molding and core pulling; a first mold core for forming the left channel is extracted from an opening of the top of the left valve chamber; and a second mold core for forming the right channel is extracted from an opening of the top of the right valve chamber;

a first plane where an axis of the left channel is located is not coplanar with a second plane where an axis of the right channel is located;

wherein the left inlet seat, the right inlet seat, and the horizontal pipe constitute a single monolithic piece; and each of the left channel and the right channel is bounded, between the respective valve chamber outlet and the respective inlet of the mixing chamber, by a continuous imperforate wall of the single monolithic piece, such that the left channel opens only at the left valve chamber outlet and the left inlet of the mixing chamber, and the right channel opens only at the right valve chamber outlet and the right inlet of the mixing chamber; and wherein the left inlet and the right inlet of the mixing chamber are staggered from each other in both a vertical direction and a front-to-rear direction.

2. The faucet body according to claim 1, wherein the first plane where the axis of the left channel is located intersects with or is parallel to the second plane where the axis of the right channel is located.

3. The faucet body according to claim 2, wherein the left inlet of the mixing chamber is located on the second plane where the axis of the right channel is located, and the left valve chamber outlet is not located on the second plane where the axis of the right channel is located; alternatively, the left inlet of the mixing chamber is not located on the second plane where the axis of the right channel is located, and the left valve chamber outlet is located on the second plane where the axis of the right channel is located; alternatively, the left inlet of the mixing chamber and the left valve chamber outlet are not located on the second plane where the axis of the right channel is located; and alternatively the right inlet of the mixing chamber is located on the first plane where the axis of the left channel is located, and the right valve chamber outlet is not located on the first plane where the axis of the left channel is located; alternatively, the right inlet of the mixing chamber is not located on the first plane where the axis of the left channel is located, and the right valve chamber outlet is located on the first plane where the axis of the left channel is located; and alternatively, the right inlet of the mixing chamber and the right valve chamber outlet are not located on the first plane where the axis of the left channel is located.

4. The faucet body according to claim 1, wherein water flows entering the mixing chamber from the left inlet and the right inlet of the mixing chamber form a rotational flow along an inner circumferential wall of the mixing chamber.

5. The faucet body according to claim 4, wherein the water flows entering the mixing chamber from the left inlet and the right inlet of the mixing chamber enter respectively along tangential directions of the inner circumferential wall of the mixing chamber.

6. The faucet body according to claim 1, wherein the left valve chamber is cylindrical, and the first plane where the axis of the left channel is located is coplanar with a plane passing through an axis of the left valve chamber; and the right valve chamber is cylindrical, and the second plane where the axis of the right channel is located is coplanar with a plane passing through an axis of the right valve chamber.

7. The faucet body according to claim 1, wherein the left valve chamber and the right valve chamber are cylindrical;

and an axis of the outlet of the mixing chamber is not located on a plane passing through an axis of the left valve chamber and an axis of the right valve chamber.

8. The faucet body according to claim 7, wherein the axis of the outlet of the mixing chamber intersects with or is parallel to the plane passing through the axis of the left valve chamber and the axis of the right valve chamber.

9. The faucet body according to claim 1, wherein the left valve chamber inlet is integrated with a left inlet pipe, and the right valve chamber inlet is integrated with a right inlet pipe; the left inlet pipe is coaxial with the left valve chamber, and the right inlet pipe is coaxial with the right valve chamber; each of an outer wall of the left inlet pipe and an outer wall of the right inlet pipe is provided with an insert-molded external threaded sleeve with an external thread; and the insert-molded external threaded sleeve is made of stainless steel, zinc alloy, aluminum, or copper.

10. The faucet body according to claim 1, wherein the left valve chamber inlet is integrated with a left inlet pipe, and the right valve chamber inlet is integrated with a right inlet pipe; the left inlet pipe is coaxial with the left valve chamber, and the right inlet pipe is coaxial with the right valve chamber; and each of an outer wall of the left inlet pipe and an outer wall of the right inlet pipe is integrated with an external thread.

11. A faucet, comprising the faucet body according to claim 1, a left valve trim, and a right valve trim, wherein the faucet body is H-shaped; the left valve trim is located in the left valve chamber, and the right valve trim is located in the right valve chamber;

the left valve chamber inlet is communicated with a cold water source; and the right valve chamber inlet is communicated with a hot water source.

12. The faucet according to claim 11, wherein in the faucet body, the first plane where the axis of the left channel is located intersects with or is parallel to the second plane where the axis of the right channel is located.

13. The faucet according to claim 12, wherein in the faucet body, the left inlet of the mixing chamber is located on the second plane where the axis of the right channel is located, and the left valve chamber outlet is not located on the second plane where the axis of the right channel is located; alternatively, the left inlet of the mixing chamber is not located on the second plane where the axis of the right channel is located, and the left valve chamber outlet is located on the second plane where the axis of the right channel is located; alternatively, the left inlet of the mixing chamber and the left valve chamber outlet are not located on the second plane where the axis of the right channel is located; and alternatively the right inlet of the mixing chamber is located on the first plane where the axis of the left channel is located, and the right valve chamber outlet is not located on the first plane where the axis of the left channel is located; alternatively, the right inlet of the mixing chamber is not located on the first plane where the axis of the left channel is located, and the right valve chamber outlet is located on the first plane where the axis of the left channel is located; and alternatively, the right inlet of the mixing chamber and the right valve chamber outlet are not located on the first plane where the axis of the left channel is located.

14. The faucet according to claim 11, wherein in the faucet body, water flows entering the mixing chamber from the left inlet and the right inlet of the mixing chamber form a rotational flow along an inner circumferential wall of the mixing chamber.

15. The faucet according to claim 14, wherein in the faucet body, the water flows entering the mixing chamber from the left inlet and the right inlet of the mixing chamber enter respectively along tangential directions of the inner circumferential wall of the mixing chamber.

16. The faucet according to claim 11, wherein in the faucet body, the left valve chamber is cylindrical, and the first plane where the axis of the left channel is located is coplanar with a plane passing through an axis of the left valve chamber; and the right valve chamber is cylindrical, and the second plane where the axis of the right channel is located is coplanar with a plane passing through an axis of the right valve chamber.

* * * * *